(No Model.)

O. R. COOKE.
NUT LOCK.

No. 388,764. Patented Aug. 28, 1888.

WITNESSES.

INVENTOR.
O. R. Cooke.
By James Sheehy
Attorney.

UNITED STATES PATENT OFFICE.

OSBORN R. COOKE, OF SALEM, OHIO.

NUT-LOCK.

SPECIFICATION forming part of Letters Patent No. 388,764, dated August 28, 1888.

Application filed August 6, 1887. Serial No. 246,362. (No model.)

*To all whom it may concern:*

Be it known that I, OSBORN R. COOKE, a citizen of the United States, residing at Salem, in the county of Columbiana and State of Ohio, have invented a new and useful Improvement in Nut-Locks, of which the following is a specification.

This invention has relation to improvements in devices for locking nuts on bolts, and is more particularly adapted for use on railways in which the nuts are secured to the fish-plates, as will be hereinafter more fully set forth, and pointed out in the claim.

The invention will be fully understood from the following description and claim when taken in connection with the annexed drawings, in which—

Figure 1:
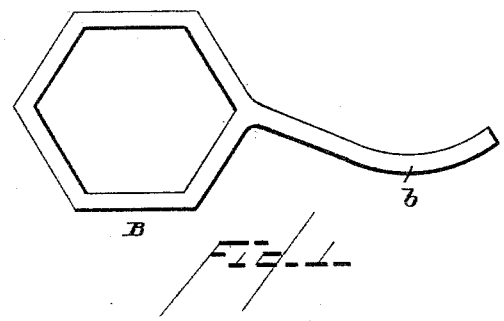
Figure 2:
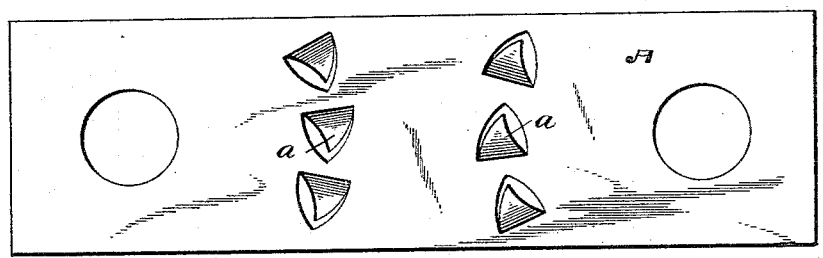
Figure 3:
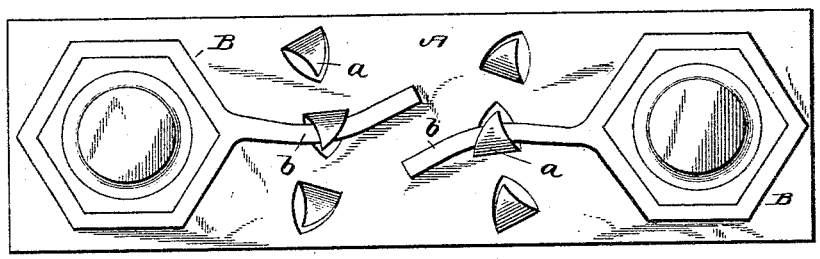

Figure 1 is a view of the locking-lever adapted to embrace a nut. Fig. 2 is a front view of a plate with my improvements attached; and Fig. 3 is a view of the plate with the bolts, nuts, and locking devices in proper position.

Before describing the details of construction, I desire to say that I am well aware that it is not new to provide a lever to operate in conjunction with a bolt having a slot, the said lever having one end bent to enter the slot of the bolt, and after passing partly around the nut has its opposite end extended to enter notches in a washer. It is also old to provide a washer with slits which may be turned up against the flat sides of a nut to lock the same; but I am not aware that any one has heretofore provided a lever embracing a nut and a plate having locking-lugs adapted to be turned down over the arm of the lever to lock the same.

Referring by letter to the said drawings, A indicates a plate for railroad-rails, which may be of the ordinary construction, having at a suitable point from the bolt-apertures a series of locking-lugs, *a*, which may be struck up from the said plate or suitably formed therein, being so arranged as to receive and hold the locking device from casual turning; but these lugs, when desired, may be bent up so as to free their hold on the said lever and allow the nut to turn in the proper direction. I have illustrated this locking device B as of a polygonal contour with a curved handle or lever, *b*; but it is obvious that the form of the receiving portion may be varied according to the form of the nut to be embraced thereby.

In operation it will be seen that after the plates have been properly adjusted to the rails and the bolts passed through the apertures therein the nuts may be applied and turned a suitable distance by any suitable means, when the locking device is then placed over the nuts and turned to the proper tightness until its arm has passed the desired securing-lug, *a*, of the plate. The lug is then bent down on the arm, as described, when the nut will be prevented from turning.

Having described my invention, what I claim is—

The combination, in a nut-lock, of the plate having the series of locking-lugs arranged as shown and described, and the locking device adapted to embrace a nut upon a bolt, and having the curved arm adapted to be secured by the said locking-lugs on the fish-plate, substantially as specified.

OSBORN R. COOKE.

Witnesses:
   HENRY C. JONES,
   WM. McLERAN.